United States Patent
Chen et al.

(10) Patent No.: US 7,885,064 B2
(45) Date of Patent: Feb. 8, 2011

(54) PORTABLE COMPUTER AND LOCKING MECHANISM THEREOF

(75) Inventors: Min-Feng Chen, Taipei (TW); Chien-Chung Chien, Taipei (TW); Ming-Hui Chen, Taipei (TW); Shu-Hua Yeh, Taipei (TW); Chien-Heng Kuo, Taipei (TW); Yen-Chang Lai, Taipei (TW)

(73) Assignee: Inventec Corporation (TW)

( * ) Notice: Subject to any disclaimer, the term of this patent is extended or adjusted under 35 U.S.C. 154(b) by 53 days.

(21) Appl. No.: 12/509,029

(22) Filed: Jul. 24, 2009

(65) Prior Publication Data

US 2010/0136398 A1 Jun. 3, 2010

(30) Foreign Application Priority Data

Nov. 28, 2008 (CN) .................... 2008 1 0182098

(51) Int. Cl.
*G06F 1/16* (2006.01)
(52) U.S. Cl. .................... 361/679.58; 292/242
(58) Field of Classification Search ............ 361/697.58; 429/100, 97; 292/242
See application file for complete search history.

(56) References Cited

U.S. PATENT DOCUMENTS

| | | | | |
|---|---|---|---|---|
| 5,140,138 A | * | 8/1992 | Tanaka .................... 235/1 D |
| 5,905,632 A | * | 5/1999 | Seto et al. ............ 361/679.55 |
| 6,678,154 B2 | * | 1/2004 | DeLuga ................ 361/679.58 |
| 6,724,616 B2 | * | 4/2004 | Kuo et al. ............ 361/679.02 |
| 6,785,141 B2 | * | 8/2004 | Fang .......................... 361/727 |
| 6,943,527 B2 | * | 9/2005 | Liu et al. .................... 320/107 |
| 6,944,016 B2 | * | 9/2005 | Chen et al. ............ 361/679.33 |
| 7,095,607 B2 | * | 8/2006 | Imamura ............... 361/679.57 |
| 7,234,738 B2 | * | 6/2007 | Tsao et al. .................. 292/242 |
| 7,542,274 B2 | * | 6/2009 | Minaguchi et al. ..... 361/679.55 |
| 2004/0214077 A1 | * | 10/2004 | Huang ......................... 429/97 |
| 2007/0082259 A1 | * | 4/2007 | Lin et al. ...................... 429/97 |
| 2007/0090266 A1 | * | 4/2007 | Hsu ........................... 248/500 |
| 2007/0091556 A1 | * | 4/2007 | Wu ............................. 361/683 |

* cited by examiner

*Primary Examiner*—Lisa Lea-Edmonds
(74) *Attorney, Agent, or Firm*—Lowe Hauptman Ham & Berner, LLP

(57) ABSTRACT

A portable computer and a locking mechanism thereof are provided. The portable computer includes a battery, a host and a locking mechanism. The battery has a locking hole. The battery includes a restraining protrusion. The host has a receiving through. The locking mechanism is disposed in the receiving through. The locking mechanism includes a main body and a locking protrusion. The main body has a first restraining concave and a second restraining concave. The locking protrusion is connected to the main body. When the restraining protrusion is placed in the first restraining concave, the locking protrusion is locked in the locking hole, so that the battery is locked in the receiving through. When the restraining protrusion is placed in the second restraining concave, the locking protrusion leaves the locking hole, so that the battery is dismounted from the receiving through.

10 Claims, 5 Drawing Sheets

PORTABLE COMPUTER AND LOCKING MECHANISM THEREOF

This application claims the benefit of China application Serial No. 200810182098.1, filed Nov. 28, 2008, the subject matter of which is incorporated herein by reference.

BACKGROUND OF THE INVENTION

1. Field of the Invention

The invention relates in general to a portable computer and a locking mechanism thereof, and more particularly to a portable computer with detachable battery and a locking mechanism thereof.

2. Description of the Related Art

With the features of lightweight, slimness and compactness, portable computer has gradually replaced desk-top computer and become the mainstream product in the computer market. The portable computer includes elements such as display screen, host and battery. The battery, which is disposed in the host, stores capacitance, enables the use of the portable computer in the absence of a power point.

As the battery has limited capacitance, the user needs to prepare a second battery to prolong the duration time of the portable computer. However, the battery has a limited lifespan, and the capacitance of the battery decays along with the duration of use. When the battery is out of order, the user has to replace the old battery with a new one.

Under the circumstances that the user needs to mount/dismount the battery, how to provide a design enabling the user to easily mount/dismount the battery has become an important goal to achieve.

SUMMARY OF THE INVENTION

The invention is directed to a portable computer and a locking mechanism thereof. With the design of a restraining concave and a locking protrusion, the portable computer and the locking mechanism thereof provide the user with great convenience in mounting or dismounting a battery.

According to a first aspect of the present invention, a portable computer is provided. The portable computer includes a battery, a host and a locking mechanism. The battery has a locking hole. The battery includes a restraining protrusion. The host has a receiving through. The locking mechanism is disposed in the receiving through. The locking mechanism includes a main body and a locking protrusion. The main body has a first restraining concave and a second restraining concave. The locking protrusion is connected to the main body. When the restraining protrusion is placed in the first restraining concave, the locking protrusion is locked in the locking hole, so that the battery is locked in the receiving through. When the restraining protrusion is placed in the second restraining concave, the locking protrusion leaves the locking hole, so that the battery is dismounted from the receiving through.

According to a second aspect of the present invention, a locking mechanism is provided. The locking mechanism is for locking a battery on a host of a portable computer. The battery has a locking hole. The battery includes a restraining protrusion. The host has a receiving through. The locking mechanism is disposed in the receiving through. The locking mechanism includes a main body and a locking protrusion. The main body has a first restraining concave and a second restraining concave. The locking protrusion is connected to the main body. When the restraining protrusion is placed in the first restraining concave, the locking protrusion is locked in the locking hole, so that the battery is locked in the receiving through. When the restraining protrusion is placed in the second restraining concave, the locking protrusion leaves the locking hole, so that the battery is dismounted from the receiving through.

The invention will become apparent from the following detailed description of the preferred but non-limiting embodiments. The following description is made with reference to the accompanying drawings.

DETAILED DESCRIPTION OF THE INVENTION

Preferred embodiments are disclosed below for elaborating the invention. However, the following embodiments are for the purpose of elaboration only, not for limiting the scope of protection of the invention. Besides, secondary elements are omitted in the following embodiments to highlight the technical features of the invention.

Figure 1:
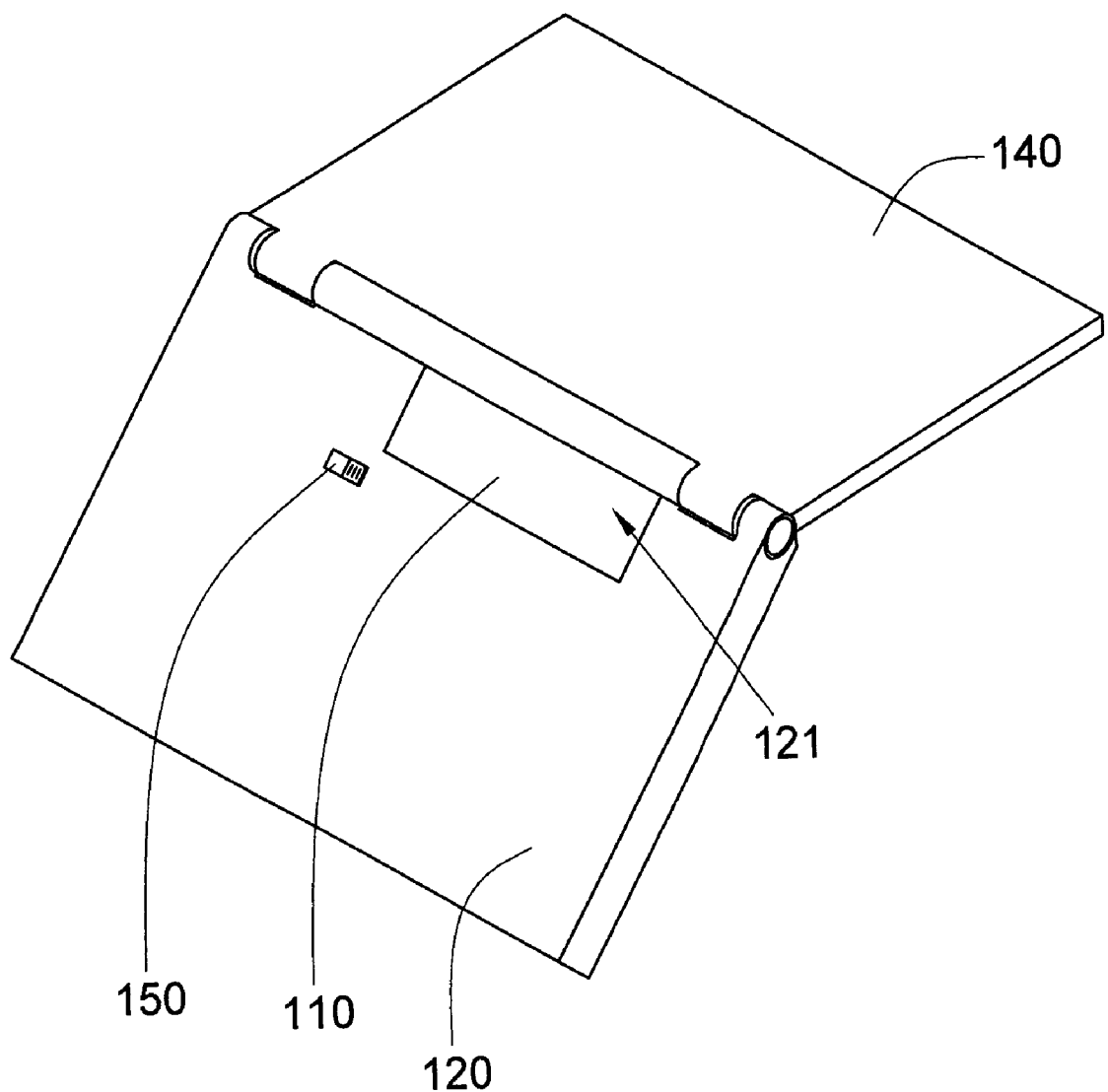
FIG. 1 shows a portable computer according to a preferred embodiment of the invention.

Referring to FIG. 1, a portable computer 100 according to a preferred embodiment of the invention is shown. The portable computer 100 includes a battery 110, a host 120, a locking mechanism 180 (indicated in FIG. 2), a display screen 140 and a locking button 150. The host 120 has a receiving through 121 in which the battery 110 is locked, so that the battery 110 is electrically connected to the host 120 to provide power to the host 120. Alternatively, the user can push the locking button 150 to dismount the battery 110 from the receiving through 121 when the battery 110 needs to be replaced.

Figure 2:
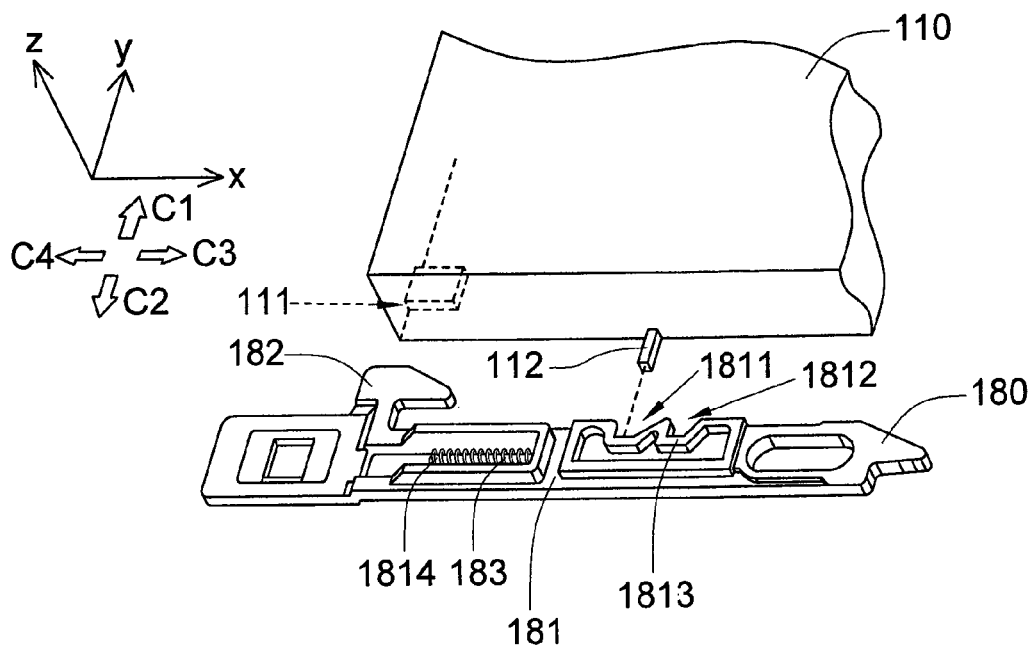
FIG. 2 shows a 3-D diagram of a battery and a locking mechanism of FIG. 1.
Figure 3A:
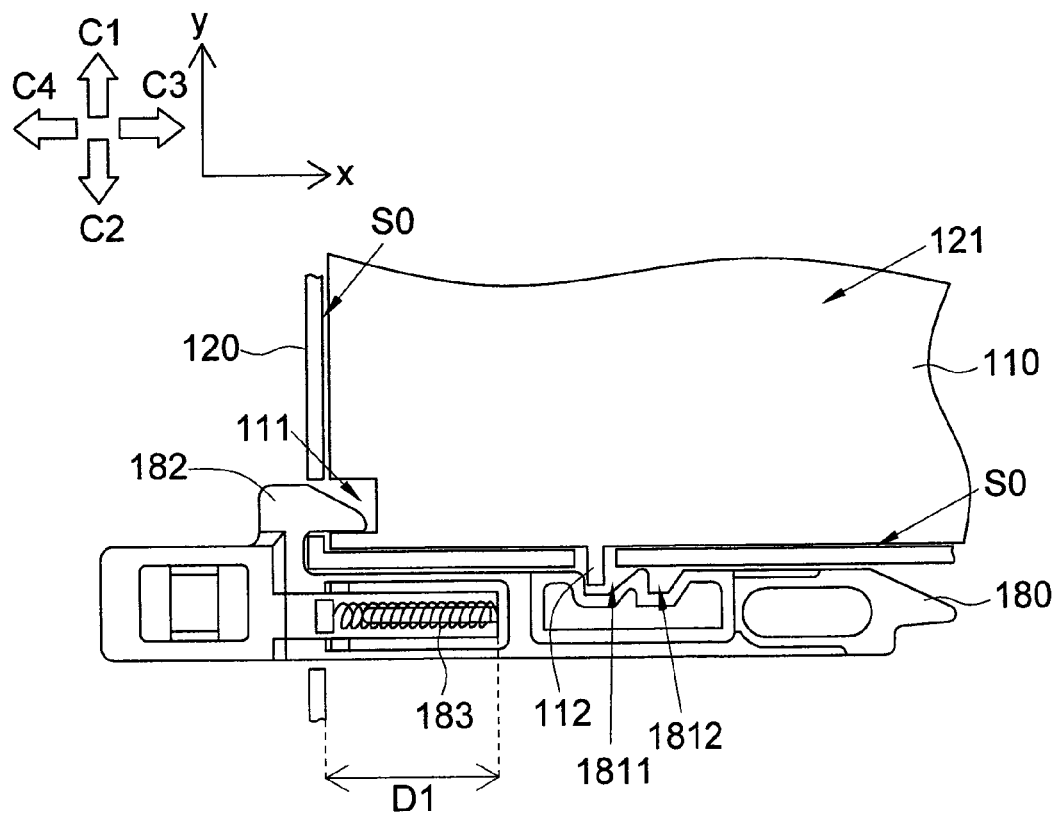
FIGS. 3A~3F show the operating relationships among the battery, the host and the locking mechanism.

Referring to FIG. 2, a 3-D diagram of a battery 110 and a locking mechanism 180 of FIG. 1 is shown. The battery 110 has a locking hole 111, and includes a restraining protrusion 112. The locking mechanism 180 includes a main body 181, a locking protrusion 182 and an elastic element 183. The main body 181 has a first restraining concave 1811 and a second restraining concave 1812, and includes an elastic arm 1813 and an extension column 1814. The first restraining concave 1811 and the second restraining concave 1812 are disposed on the elastic arm 1813. The elastic arm 1813 can slightly bounce in the first and the second direction C1 and C2 for driving the first restraining concave 1811 and the second restraining concave 1812 to move in the first and the second direction C1 and C2 slightly, so that the first restraining concave 1811 and the second restraining concave 1812 are bendable. As the locking protrusion 182 is connected to the main body 181, the locking protrusion 182 also moves when the main body 181 and its elements move. One end of the elastic element 183 is mounted on the extension column 1814, and the other end of the elastic element 183 is placed on the host 120 (as indicated in FIG. 3A). Therefore, the main body 181 will compress the elastic element 183 when the main body 181 moves in the fourth direction C4.

The operations of the above elements are disclosed below with accompanying drawings. Referring to FIGS. 3A~3F, the operating relationships among the battery 110, the host 120 and the locking mechanism 180 are shown. As indicated in FIG. 3A, when the battery 110 is mounted in the receiving through 121, the restraining protrusion 112 is placed in the first restraining concave 1811 and the locking protrusion 182 is locked in the locking hole 111. When the locking protrusion 182 is locked in the locking hole 111, the battery 110 is restrained from moving in the first direction C1, and the side-wall S0 of the receiving through 121 also restrains the battery 110 from moving in the second, the third or the fourth direction C2, C3, C4. Therefore, the battery 110 is firmly locked in the receiving through 121 (only a part of the side-wall S0 is indicated in FIG. 3A).

Figure 3B:
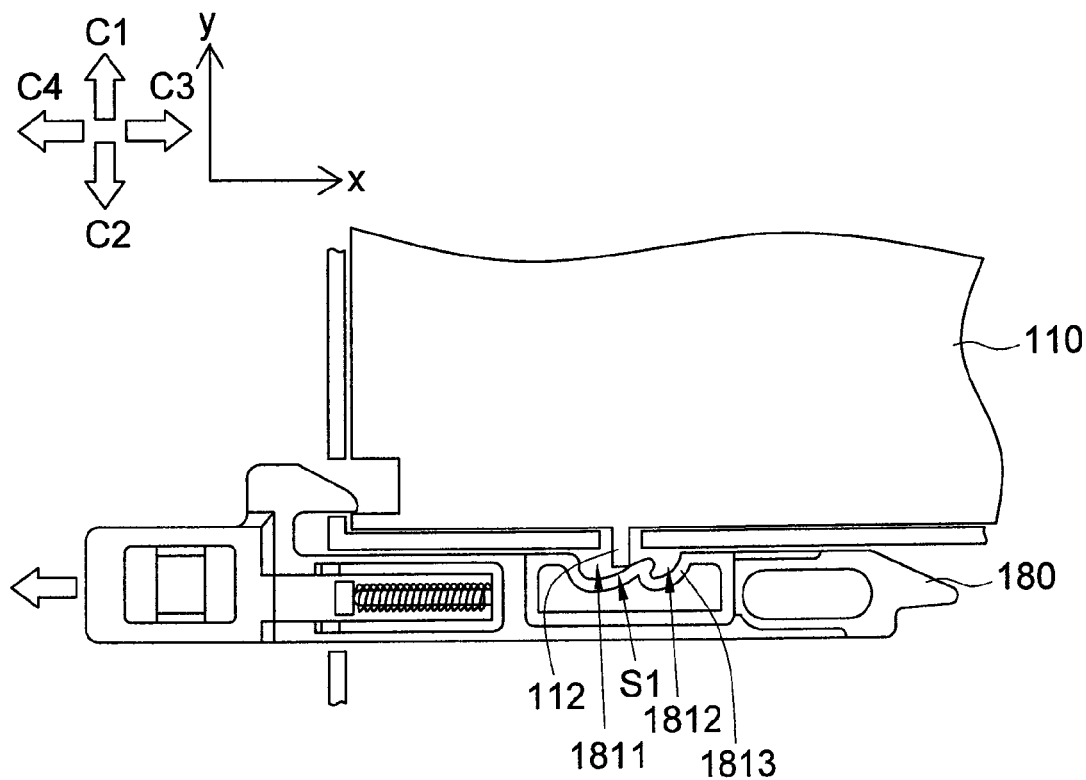

As indicated in FIG. 3B, when the user pushes the locking button 150 (indicated in FIG. 1) to move in the fourth direction C4 by one single hand, the locking mechanism 180 also move in the fourth direction C4. Meanwhile, the restraining protrusion 112 of the battery 110 slides along a slanting side-wall S1 of the first restraining concave 1811, and the elastic arm 1813, being squeezed by the restraining protrusion 112, bounces in the second direction C2.

Figure 3C:
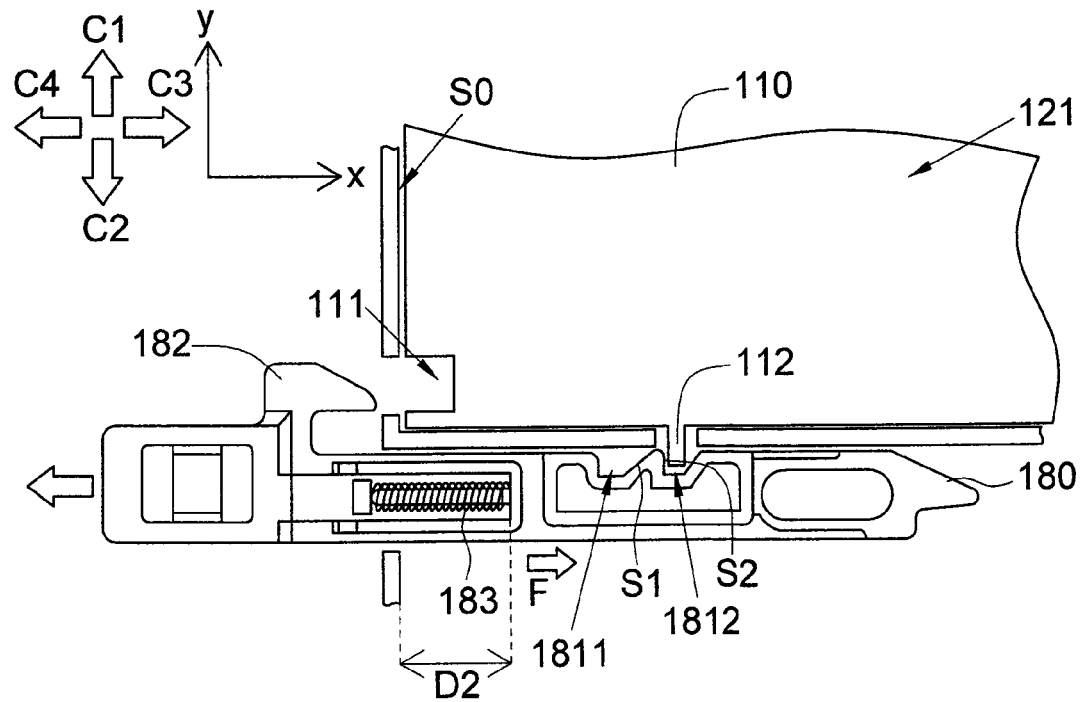

As indicated in FIG. 3C, when the restraining protrusion 121 of the battery 110 crosses over the slanting side-wall S1 of the first restraining concave 1811, the restraining protrusion 121 being restrained by a steep side-wall S2 is placed in the second restraining concave 1812. Meanwhile, the locking protrusion 182, after leaving the locking hole 111, is inserted into the side-wall S0 of the receiving through 121. The battery 110 no more restrained by the locking protrusion 182 can then be dismounted from the receiving through 121 in the first direction C1.

Meanwhile, the elastic element 183 is compressed, and the length of the elastic element 183 contracts to the second the length D2 (indicated in FIG. 3C) from the first the length D1 (indicated in FIG. 3A). Therefore, the elastic element 183 provides an elastic force F to the main body 181 in the third direction C3. As indicated in FIG. 3C, as the restraining protrusion 112 of the battery 110 is still placed in the second restraining concave 1812, the main body 181 still cannot move in the third direction C3.

Figure 3D:
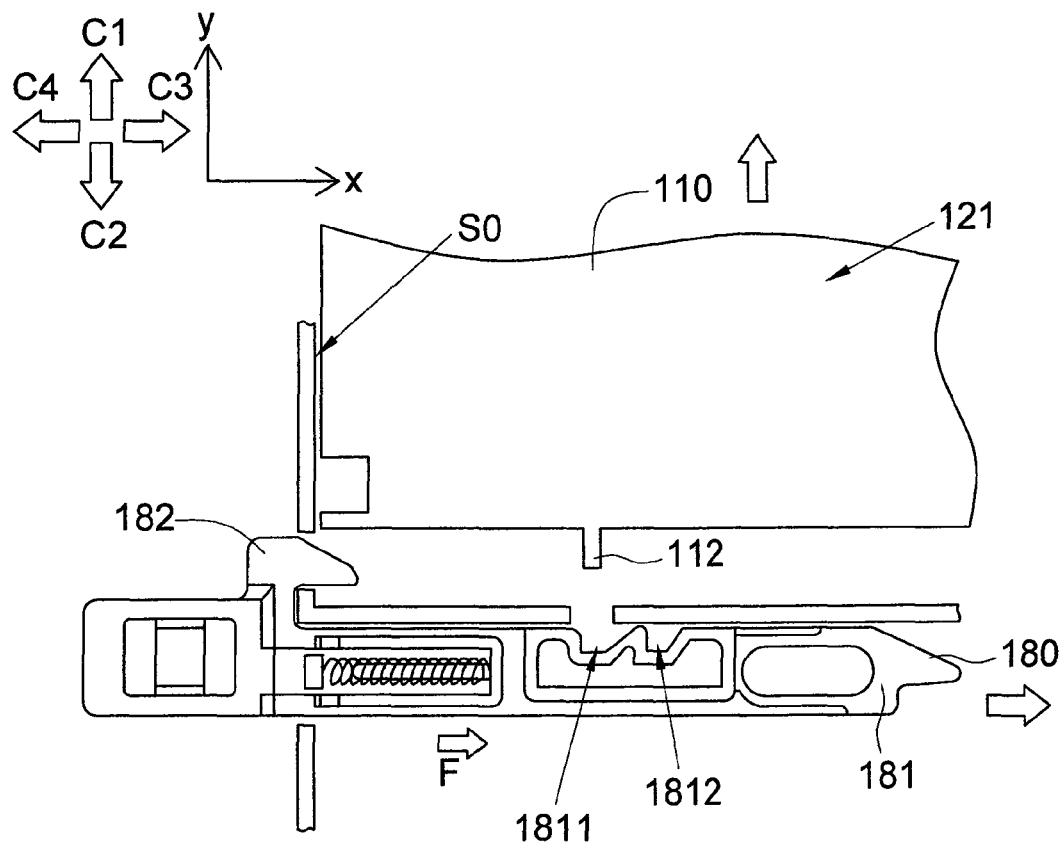

As indicated in FIG. 3D, when the user dismounts the battery 110 from the receiving through 121 in the first direction C1, the restraining protrusion 112 of the battery 110 leaves the second restraining concave 1812 in the first direction C1. Meanwhile, the main body 181 is moved in the third direction C3 by an elastic force F. The first restraining concave 1811 moves in the third direction C3 along with the main body 181 until reaching the position corresponding to the restraining protrusion 112, and the locking protrusion 182 also moves in the third direction C3 along with the main body 181 and is projected from the side-wall S0 of the receiving through 121.

With the operations illustrated in FIGS. 3A~3D, the user can easily dismount the battery 110 from the receiving through 121 by one hand.

Figure 3E:
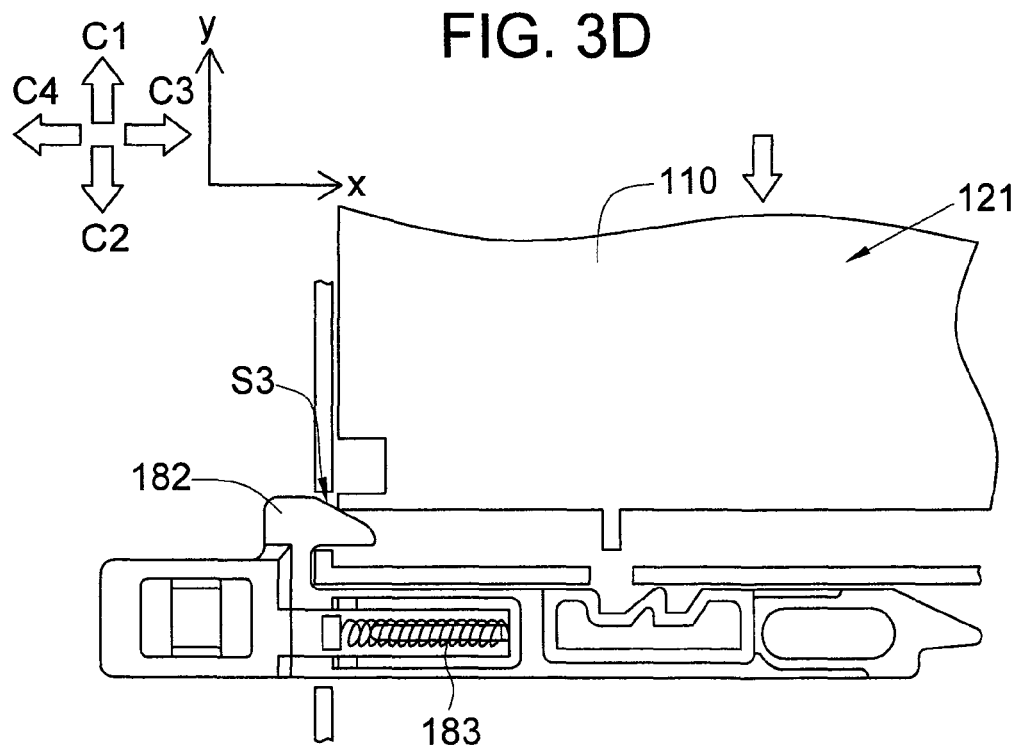

As indicated in FIG. 3E, when the user pushes the battery 110 into the receiving through 121 in the second direction C2, the battery 110 will push a bevel S3 of the locking protrusion 182 facing the opening of the receiving through 121, so that the locking protrusion 182 drives the entire main body 181 to move in the fourth direction C4. Meanwhile, the elastic element 183 remains being squeezed.

Figure 3F:
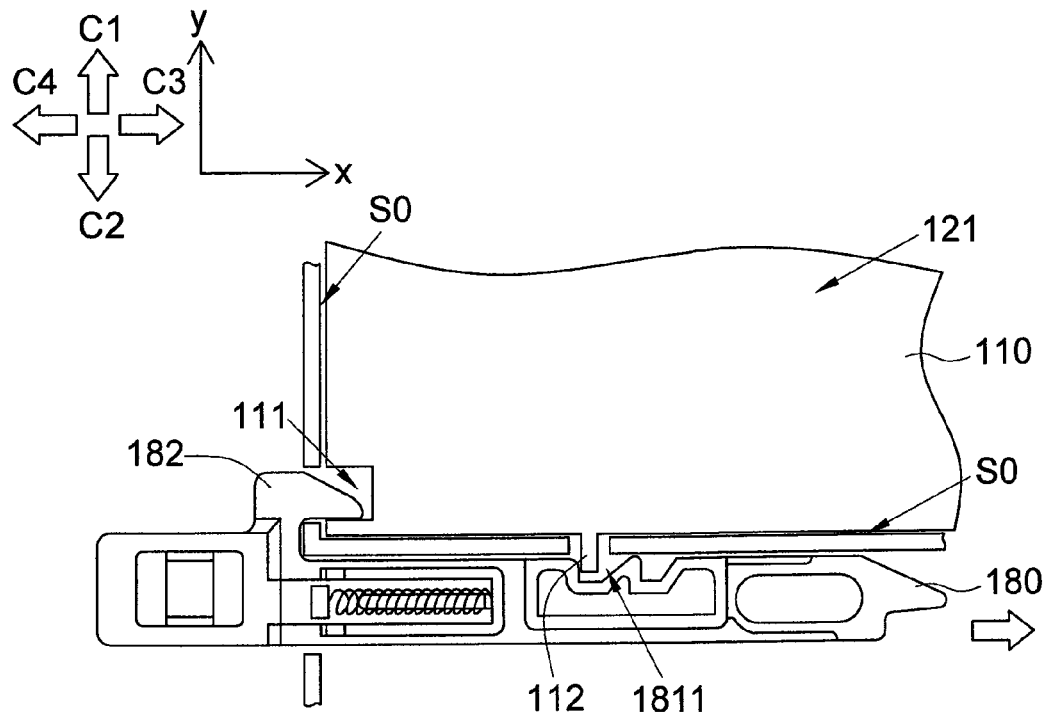

As indicated in FIG. 3F, during the process of pushing the battery 110 to the bottom of the receiving through 121 in the second direction C2, when the locking hole 111 of the battery 110 reaches the position of the locking protrusion 182, the locking protrusion 182 is inserted into the locking hole 111 and drives the entire main body 181 to move in the third direction C3. Meanwhile, the restraining protrusion 112 of the battery 110 exactly corresponds to the first restraining concave 1811. Thus, the locking protrusion 182 restrains the battery 110 from moving in the first direction C1, and the side-wall S0 of the receiving through 121 also restrains the battery 110 from moving in the second, the third or the fourth direction C2, C3, C4. Therefore, so that the battery 110 is locked in the receiving through 121 (only a part of the side-wall S0 is illustrated in FIG. 3F).

With the operations illustrated in FIGS. 3E~3F, the user can easily dismount the battery 110 from the receiving through 121 by one hand.

Figure 4:
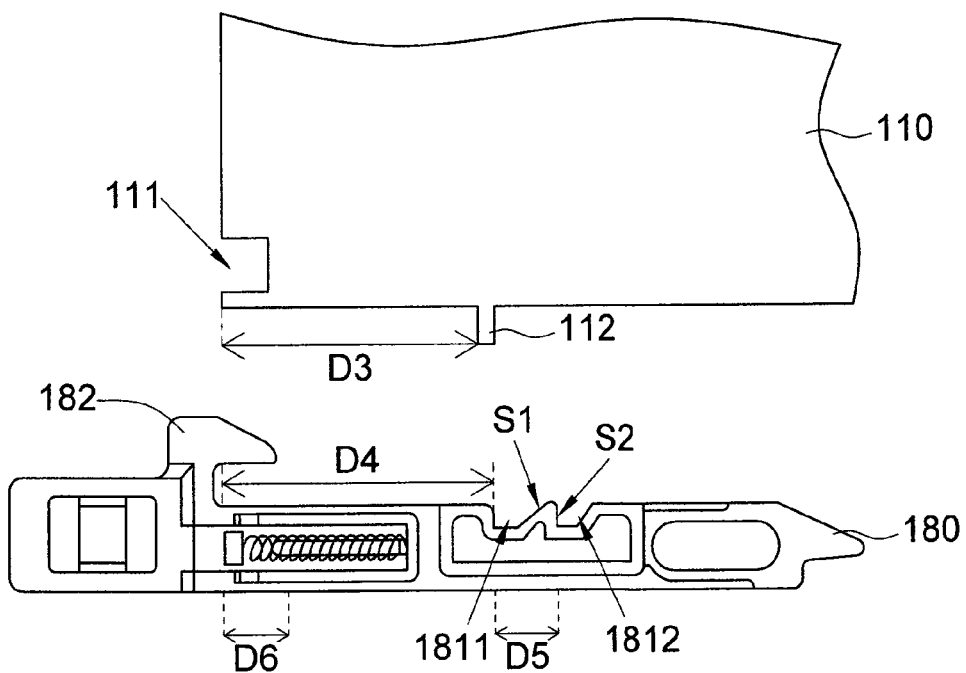
FIG. 4 shows the dimension of the battery and the locking mechanism.

To put it in greater details, the locking mechanism 180 has several preferred dimension designs enabling the locking mechanism 180 to smoothly mount/dismount the battery 110. Referring to FIG. 4, a dimension diagram of the battery 110 and the locking mechanism 180 is shown. As indicated in FIG. 4, the distance D3 between the locking hole 111 and the restraining protrusion 112 is substantially equal to the distance D4 between the locking protrusion 182 and the first restraining concave 1811. Thus, when the locking protrusion 182 is locked in the locking hole 111, it is ascertained that the restraining protrusion 112 is exactly placed in the first restraining concave 1811.

Besides, the distance D5 between the first restraining concave 1811 and the second restraining concave 1812 is substantially equal to the length D6 of the locking protrusion 182. Thus, when the locking protrusion 182 is inserted into the side-wall S0 of the receiving through 121 (indicated in FIG. 3C), the restraining protrusion 112 originally placed in the first restraining concave 1811 will exactly be placed in the second restraining concave 1812.

Furthermore, the contained angle between the slanting side-wall S1 of the first restraining concave 1811 and the third direction C3 is smaller than 45 degrees, so that the restraining protrusion 112 can easily slide to the second restraining concave 1812 from the slanting side-wall S1.

Moreover, the contained angle between the steep side-wall S2 and the third direction C3 is substantially close to 90 degrees, so that the steep side-wall S2 effectively stops the restraining protrusion 112.

According to the portable computer and the locking mechanism thereof disclosed in the above embodiments of the invention, the design of a restraining concave and a locking protrusion at least provides the portable computer and the locking mechanism thereof with many advantages exemplified below.

1. With the design of the restraining concave and the locking protrusion, the user can easily dismount battery from the receiving through by pushing the locking button with one hand only. The user does not need to use both hands in dismounting the battery.

2. With the design of the restraining concave and the locking protrusion, the user can easily mount battery into the receiving through by pushing the locking button with one hand only. The user does not need to use both hands in mounting the battery.

3. The elastic arm has a certain level of elasticity, so that the restraining protrusion can move between the first restraining concave and the second restraining concave.

4. Due to the elastic force applied onto the main body by the elastic element, when the battery leaves the receiving through, the locking protrusion can move along with the main body and project from a side-wall of the receiving through.

5. With the design of the bevel of the locking protrusion, during the process of pushing the battery into the receiving through, the locking mechanism is moved naturally until the battery and the locking mechanism are engaged again.

6. The distance between the locking hole and the restraining protrusion is substantially equal to the distance between the locking protrusion and the first restraining concave. Thus, when the locking protrusion is locked in the locking hole, it is ascertained that the restraining protrusion is exactly placed in the first restraining concave.

7. The distance between the first restraining concave and the second restraining concave is substantially equal to the length of the locking protrusion. Thus, when the locking protrusion is inserted into the side-wall of the receiving through, the restraining protrusion originally being placed in the first restraining concave will exactly be placed in the second restraining concave.

8. The contained angle between a slanting side-wall of the first restraining concave and a third direction is smaller than 45 degrees, so that the restraining protrusion can easily slide to the second restraining concave from the slanting side-wall.

9. The contained angle between a steep side-wall and the third direction is substantially close to 90 degrees, so that the steep side-wall effectively stops the restraining protrusion.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer, comprising:
   a battery having a locking hole, wherein the battery comprises a restraining protrusion;
   a host having a receiving through; and
   a locking mechanism disposed in the receiving through, wherein the locking mechanism comprises:
      a main body having a first restraining concave and a second restraining concave; and
      a locking protrusion connected to the main body, wherein when the restraining protrusion is placed in the first restraining concave, the locking protrusion is locked in the locking hole, so that the battery is locked in the receiving through, and when the restraining protrusion is placed in the second restraining concave, the locking protrusion leaves the locking hole, so that the battery is dismounted from the receiving through.

2. The portable computer according to claim 1, wherein the first restraining concave has a slanting side-wall being close to the second restraining concave.

3. The portable computer according to claim 1, wherein the second restraining concave has a steep side-wall being close to the first restraining concave.

4. The portable computer according to claim 1, wherein the first restraining concave and the second restraining concave are bendable.

5. The portable computer according to claim 1, wherein the main body comprises an elastic arm on which the first restraining concave and the second restraining concave are disposed.

6. The portable computer according to claim 1, wherein the locking mechanism further comprises:
   an elastic element disposed between the main body and the host, wherein when the restraining protrusion is placed in the first restraining concave, the main body contracts the elastic element.

7. The portable computer according to claim 6, wherein the main body comprises:
   an extension column on which one end of the elastic element is mounted.

8. The portable computer according to claim 1, wherein the receiving through has an opening through which the battery enters and leaves the receiving through, and the locking protrusion has a bevel which faces the opening.

9. The portable computer according to claim 1, wherein the distance between the locking hole and the restraining protrusion is substantially equal to the distance between the locking protrusion and the first restraining concave.

10. A locking mechanism for locking a battery on a host of a portable computer, wherein the battery having a locking hole comprises a restraining protrusion, the host has a receiving through in which the locking mechanism is disposed, and the locking mechanism comprises:
   a main body having a first restraining concave and a second restraining concave; and
   a locking protrusion connected to the main body, wherein when the restraining protrusion is placed in the first restraining concave, the locking protrusion is locked in the locking hole, so that the battery is locked in the receiving through, and when the restraining protrusion is placed in the second restraining concave, the locking protrusion leaves the locking hole, so that the battery is dismounted from the receiving through.

* * * * *